(12) United States Patent
Wang et al.

(10) Patent No.: US 8,418,366 B2
(45) Date of Patent: Apr. 16, 2013

(54) INTERNAL GEAR MANUFACTURING METHOD AND METALLIC GLASS INTERNAL GEAR MANUFACTURED THEREBY

(75) Inventors: Xinmin Wang, Miyagi (JP); Akihisa Inoue, Miyagi (JP); Yukiharu Shimizu, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 310 days.

(21) Appl. No.: 12/745,166

(22) PCT Filed: Nov. 27, 2008

(86) PCT No.: PCT/JP2008/071582
§ 371 (c)(1),
(2), (4) Date: May 27, 2010

(87) PCT Pub. No.: WO2009/069716
PCT Pub. Date: Jun. 4, 2009

(65) Prior Publication Data
US 2010/0313704 A1    Dec. 16, 2010

(30) Foreign Application Priority Data
Nov. 27, 2007 (JP) .................. 2007-306557

(51) Int. Cl.
*B22D 27/15* (2006.01)
*B22D 29/00* (2006.01)

(52) U.S. Cl.
USPC ........ 29/893; 29/893.3; 29/893.34; 29/527.1; 29/527.5; 29/527.6; 164/76.1; 164/132; 164/137; 164/340; 164/369

(58) Field of Classification Search ............ 29/893, 29/893.3, 893.34, 527.5, 527.1, 527.6; 164/76.1, 164/132, 137, 340, 369
See application file for complete search history.

(56) References Cited

U.S. PATENT DOCUMENTS 1,348,158 A * 8/1920 Doty ........................ 164/75
1,393,886 A * 10/1921 Doty ........................ 74/460
(Continued)

FOREIGN PATENT DOCUMENTS

| JP | 63-260659 | 10/1988 |
| JP | 8-300083 | 11/1996 |

(Continued)

OTHER PUBLICATIONS

International Search Report; PCT/JP2008/071582; Dec. 22, 2008.

*Primary Examiner* — Livius R Cazan
*Assistant Examiner* — Kaying Kue
(74) *Attorney, Agent, or Firm* — Studebaker & Brackett PC; Donald R. Studebaker

(57) ABSTRACT

An internal gear manufacturing method capable of manufacturing time reduction and easy core removal, and a metallic glass internal gear manufactured thereby. A carbon core formed into a shape of an external gear is arranged in a thin, long tubular mold of a length equal thereto with a space extending longitudinally therealong. A molten metal material is pressure-injected under a temperature higher than a melting point thereof into the space between the mold and the core. The molten metal material is resolidified by rapid cooling at or above a critical cooling rate thereof together with the mold and the core. After resolidification of the molten metal material, the core is removed by pulverization or dissolution. Along internal gear formed of the resolidified metal material is cut into a plurality of segments of a prescribed length.

8 Claims, 3 Drawing Sheets

U.S. PATENT DOCUMENTS

| | | | | |
|---|---|---|---|---|
| 1,781,143 A | * | 11/1930 | Williams | 164/131 |
| 1,828,271 A | * | 10/1931 | Arnold | 164/104 |
| 1,846,028 A | * | 2/1932 | Evans et al. | 249/112 |
| 2,278,452 A | * | 4/1942 | Kocher | 184/7.3 |
| 2,812,562 A | * | 11/1957 | Dalton | 164/72 |
| 3,494,752 A | * | 2/1970 | Daniel | 51/293 |
| 3,769,696 A | * | 11/1973 | Awano et al. | 29/598 |
| 3,826,301 A | * | 7/1974 | Brooks | 164/46 |
| RE31,767 E | * | 12/1984 | Brooks | 29/527.2 |
| 4,677,870 A | * | 7/1987 | Alshareedah | 74/431 |
| 4,798,237 A | * | 1/1989 | Nakano | 164/255 |
| 4,832,107 A | * | 5/1989 | Hass et al. | 164/98 |
| 4,899,799 A | * | 2/1990 | Drazy | 164/34 |
| 5,163,498 A | * | 11/1992 | Kantner et al. | 164/97 |
| 5,262,116 A | * | 11/1993 | Von Holdt, Sr. | 264/297.2 |
| 5,450,665 A | * | 9/1995 | Madono et al. | 29/888.1 |
| 5,479,981 A | * | 1/1996 | Kim | 164/16 |
| 5,618,171 A | * | 4/1997 | von Behr et al. | 418/152 |
| 5,688,203 A | * | 11/1997 | Yamamoto et al. | 475/331 |
| 5,915,452 A | * | 6/1999 | Conroy et al. | 164/345 |
| 6,012,350 A | * | 1/2000 | Mizuta et al. | 74/434 |
| 6,241,000 B1 | * | 6/2001 | Conroy et al. | 164/132 |
| 6,287,514 B1 | * | 9/2001 | Mizushima et al. | 420/121 |
| 6,576,177 B2 | * | 6/2003 | Fukuchi | 264/219 |
| 6,591,708 B2 | * | 7/2003 | Kobayashi et al. | 74/446 |
| 6,592,809 B1 | * | 7/2003 | Anderson et al. | 419/28 |
| 2008/0004147 A1 | * | 1/2008 | Okada | 475/149 |

FOREIGN PATENT DOCUMENTS

| | | | |
|---|---|---|---|
| JP | 11-320028 | | 11/1999 |
| JP | 2003-089015 A | | 3/2003 |
| JP | 2005-325984 A | | 11/2005 |
| JP | 2007204812 A | * | 8/2007 |
| WO | 2005/024274 | | 3/2005 |

* cited by examiner

INTERNAL GEAR MANUFACTURING METHOD AND METALLIC GLASS INTERNAL GEAR MANUFACTURED THEREBY

FIELD OF THE INVENTION

The present invention relates to an internal gear manufacturing method and a metallic glass internal gear manufactured thereby.

BACKGROUND

Included among the conventional internal gear manufacturing methods are those for cold-plastically forming gear teeth on an inner circumferential surface of a member press-formed into a cup shape by means of an internal gear forming die (for example, refer to Japanese Unexamined Patent Application Publication No. 1996-300083) and those for cutting gear teeth along an inner surface of a hollow member by press-inserting thereinto an internal gear tooth cutting chisel (for example, refer to Japanese Unexamined Patent Application Publication No. 2003-89015). Unfortunately, these conventional methods are not problem-free regarding precision and miniaturization. For example, when required to manufacture a miniaturized internal gear for use in precision devices, such as micro-geared motors that require high accuracy, the internal gear is manufactured from a resin capable of ensuring sufficient working accuracy but at the expense of hardness and strength.

To solve the above problem, proposals have been made for metallic glass internal gear manufacturing methods reliant on molten metal injection molding methods, such as die casting (Cf., e.g., International Publication Pamphlet No. 2005/024274).

SUMMARY OF THE INVENTION

The method disclosed in International Publication Pamphlet No. 2005/024274 is capable of high-precision manufacturing of a metallic glass internal gear with high hardness, high strength, and other advantages, but only in a one-at-a-time fashion, and hence is not productive enough to manufacture a large number of internal gears. Additionally and inconveniently, a molded article obtained by injection-molding undergoes overall cooling followed by thermal shrinkage, thereby irremovably confining a core within.

Proposed with a focus on the above problems, the present invention intends to provide an internal gear manufacturing method capable of manufacturing time reduction, productivity enhancement, and easy core removal, and a metallic glass internal gear manufactured thereby.

To achieve the above-described object, a first aspect of the present invention provides an internal gear manufacturing method comprising: a metal pouring step for pouring a molten metal material under a temperature higher than a melting point thereof into a space between a thin, long tubular mold and a non-metallic core with a length equal thereto and at least partially formed into a shape of an external gear, the core arranged inside and longitudinally along the mold; a metal cooling step for letting the molten metal material resolidify in the mold containing the core; and a core removal step for removing the core by pulverization or dissolution after resolidification of the molten metal material. The core removal step is preferably followed by a cutting step for cutting a molded article formed of the resolidified metal material into a plurality of segments of a prescribed length.

According to the internal gear manufacturing method relating to the present invention, the molten metal material is resolidified by rapid cooling at or above a critical cooling rate into an internal gear made of a rapidly solidified metal, such as a metallic glass, an amorphous alloy, and a nanocrystal metallic glass composite. Being non-metallic, the core is more resistant to reaction with the metal material and more expansion-resistant than a metallic core. Therefore, the core is easier to remove than a metallic one, whereby a long internal gear can easily be obtained as a molded article. A plurality of internal gears can be obtained all at one time by cutting the long internal gear into segments of a suitable length for the intended purpose. Hence, the internal gears can be manufactured in a shorter time and with a higher productivity than when manufactured one by one by injection-molding. The method does not need intact removal of the core but allows core removal by pulverization or dissolution, thereby enabling easy and high-precision internal gear manufacturing.

As described above, the molten metal material is poured into the space between the mold and the core under a temperature higher than the melting point of the metal material. Accordingly, the poured molten metal material penetrates into every corner of the space without a possibility of resolidification during pouring, thereby enabling high-precision manufacturing of a finely structured internal gear. The mold is preferably made of a metal having a thermal conductivity high enough to rapidly cool the molten metal material poured into the space. The core preferably has a melting point higher than the material metal so as not to melt even under a temperature higher than the melting point of the material metal. More preferably, the core should have a melting point of 1,000° C. or higher.

According to the internal gear manufacturing method relating to the present invention, the core may comprise a gear portion formed into a shape of an external gear; a bearing portion disposed on a first end of the gear portion and having an outer diameter smaller than that of the gear portion; and a motor engaging portion disposed on a second end of the gear portion and having an outer diameter greater than that of the bearing portion. Then, the molded article may be formed so as to integrally comprise an internal gear portion corresponding to the gear portion of the core, a bearing corresponding to the bearing portion, and a motor mounting portion corresponding to the motor engaging portion.

According to the internal gear manufacturing method relating to the present invention, the core is preferably made of carbon, boron nitride, or ceramics with a melting point of 1,000° C. or higher. Then, the core may have a melting point of 1,000° C. or higher and hence may not melt even under a temperature higher than the melting point of the metal material. Moreover, the core may be very accurately formed into an external gear. The core may not react with the metal material and hence may enable high-precision internal gear manufacturing. Because carbon has good demoldability, a carbon core is easy to remove from an inner surface of the internal gear. Because boron has a good demolding effect, a boron core can be removed easily and cleanly from the inner surface of the internal gear. A ceramic core, and in particular one made of calcium sulfate hydrate, i.e., so-called gypsum, can be removed easily and cleanly by dissolvability thereof or by dissolution with water or a gypsum solvent from the inner surface of the internal gear.

When the above-described core removal step of the internal gear manufacturing method relating to the present invention is performed by pulverization of the core, the core is preferably removed by pulverization by particle blasting. The core can easily be pulverized by blasting high-speed particles thereto. When completely pulverized by blasting small-diameter particles to every inner surface of the internal gear, the core can be removed completely. The particle blasting is preferably performed by using a shot-peening system.

The above-described metal pouring step of the internal gear manufacturing method relating to the present invention is preferably performed by pouring the molten metal material into the above-mentioned space by vacuum-pressure casting. Then, the poured molten metal material fills every corner of the space, thereby preventing incomplete filling and enabling high-precision manufacturing of a finely structured internal gear.

The second aspect of the present invention relates to a metallic glass internal gear manufactured by the internal gear manufacturing method relating to the present invention. Thanks to the internal gear manufacturing method relating to the present invention, the metallic glass internal gear relating to the present invention is manufacturable with high accuracy in a reduced per-piece manufacturing time.

The present invention provides an internal gear manufacturing method capable of manufacturing time reduction and easy core removal, and a metallic glass internal gear manufactured thereby.

DETAILED DESCRIPTION

Descriptions are made below of the best modes for carrying out the present invention with reference to drawings appended hereto.

Figure 1:
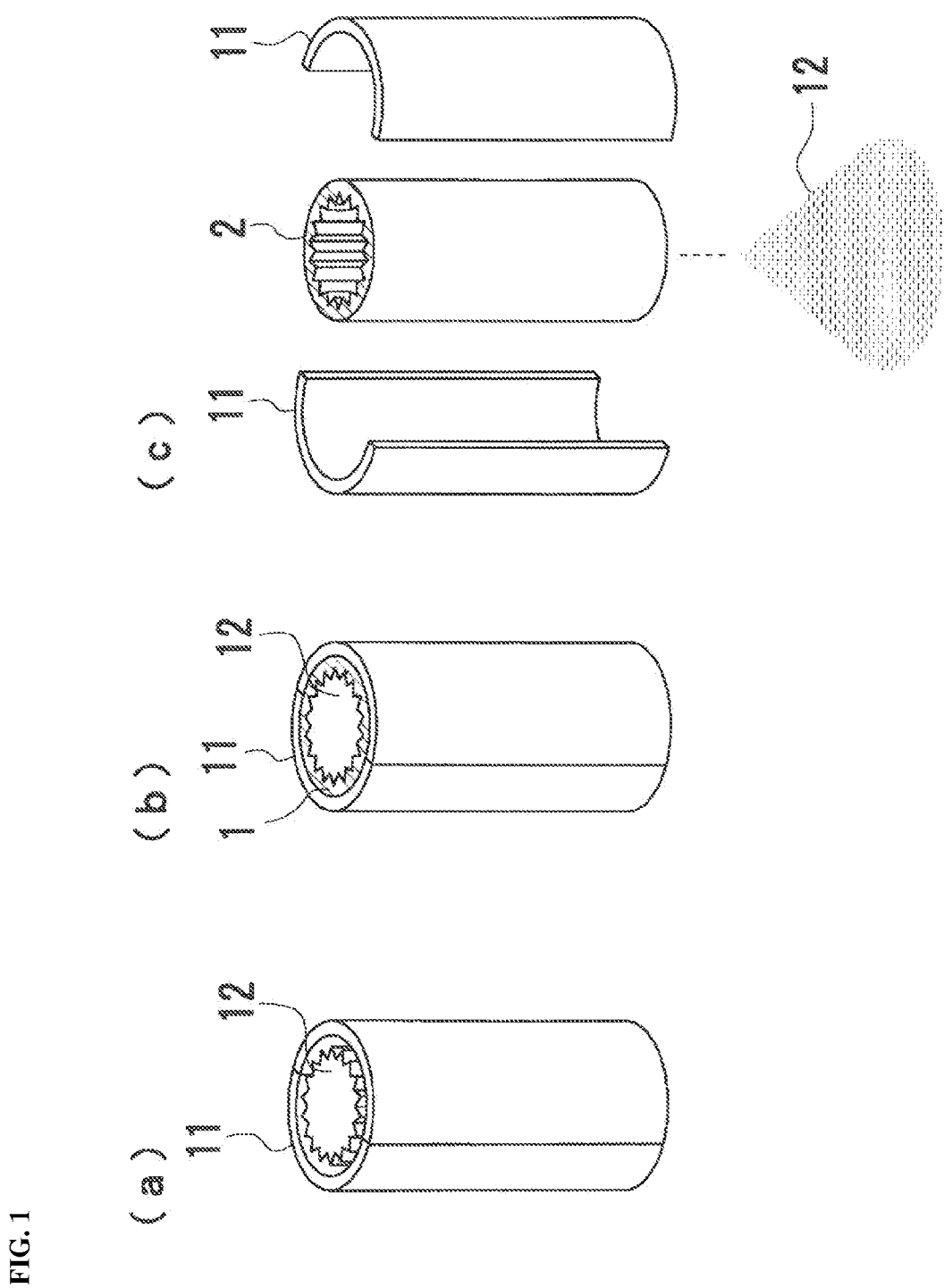
FIG. 1(a) is a perspective view of an internal gear manufacturing method according to the present invention and a metallic glass internal gear manufactured thereby, wherein core 12 is arranged inside mold 11.
FIG. 1(b) is another perspective view of an internal gear manufacturing method, wherein metal material 1 is poured into the mold 11.
FIG. 1(c) is another perspective view of an internal gear manufacturing method, wherein the core 12 is removed.
Figure 2:
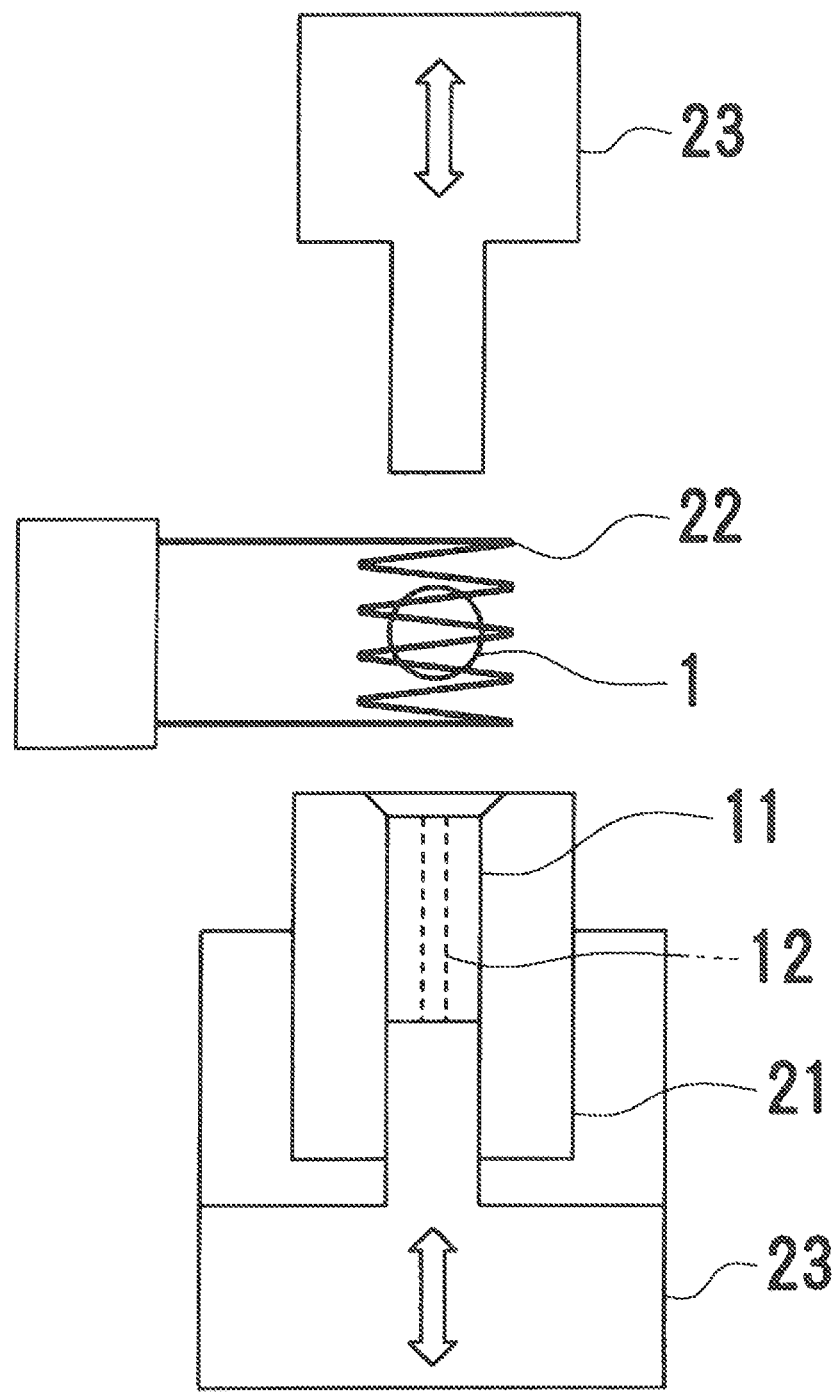
FIG. 2 is a schematic side view of an internal gear manufacturing setup for implementing the internal gear manufacturing method according to the present invention.
Figure 3:
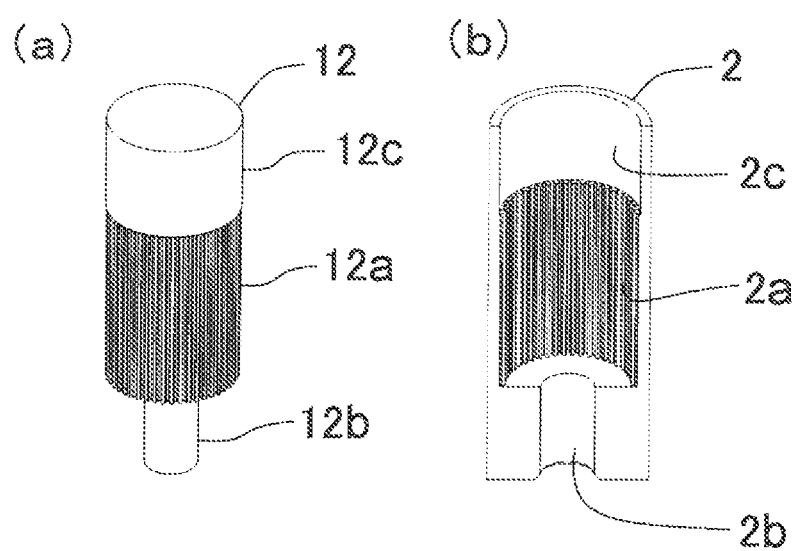
FIG. 3(a) is a perspective view of a modified core.
FIG. 3(b) is a cross-sectional perspective view of a metallic glass internal gear manufactured therewith.

FIG. 1 to FIG. 3 show embodiments of the internal gear manufacturing method according to the present invention and a metallic glass internal gear manufactured thereby.

As shown in FIG. 1, a mold 11 and a core 12 are used in the embodiment of the internal gear manufacturing method according to the present invention.

The mold 11 is made of a metal excellent in thermal conductivity and has a long tubular shape. The mold 11 is dividable along a central axis thereof into two halves. In an illustrative example, the mold 11 has an outer diameter of 2 mm. If 100 mm long, the mold 11 will enable manufacturing of twenty internal gears at a time.

The core 12 is made of carbon with a melting point of 1,000° C. or higher and is formed into a shape of a thin, long external gear. The core 12 has a length equal to that of the mold 11 and an outer diameter smaller than the inner diameter of the mold 11. As shown in FIG. 1(a), the core 12 is arranged inside the mold 11 with a space extending longitudinally therealong.

In the first preferred embodiment of the internal gear manufacturing method according to the present invention, as shown in FIG. 1(b) and FIG. 2, the mold 11 and the core 12 for molding the internal gear are placed in a vacuum chamber of a high temperature vessel 21 maintained at a temperature higher than a melting point of a metal material 1 to be poured in. In the illustrative example, the high temperature vessel 21 has an approximate internal temperature of 1,000° C. After levitation-melting in a high-frequency coil 22 disposed in the vacuum chamber, the molten metal material 1 is poured into the space between the mold 11 and the core 12. A press unit 23 set up above and below the mold 11 is then used to pressure-inject the molten metal material 1 into the space. The molten metal material 1 has an approximate temperature of 1,000° C. as injected. Meanwhile, the core 12 has a melting point of 1,000° C. or higher and hence remains unmelted. Thus, the injected molten metal material 1 fills every corner of the space, thereby preventing incomplete filling. Moreover, the molten metal material 1 is injected into the space under a temperature higher than the melting point thereof without the possibility of resolidification during injection.

The mold 11 and the core 12 are removed from the high temperature vessel 21 after filling the injection space therebetween with the molten metal material 1. The molten metal material 1 is resolidified by rapid cooling at or above a critical cooling rate thereof together with the mold 11 and the core 12. Rapid cooling of the metal material 1 together with the mold 11 and the core 12 allows use of existing equipment, including a refrigerator and a cooling vessel. The mold 11 excels in thermal conductivity, thereby allowing rapid cooling of the molten metal material 1 injected into the space therein.

After resolidification of the molten metal material 1, the core 12 is pulverized and removed, as shown in FIG. 1(c), by blasting high-speed particles thereto using a shot-peening system. Since the core 12 is made of carbon, the core 12 is easy to pulverize and remove completely from an inner surface of an internal gear 2. The core 12 can be completely pulverized and removed by blasting small-diameter particles to every inner surface of the internal gear 2.

After removal of the core 12, the mold 11 is divided into two halves to take out the internal gear 2 formed of the resolidified metal material. Thus, the first preferred embodiment of the internal gear manufacturing method according to the present invention allows resolidification of the molten metal material 1 by rapid cooling at or above the critical cooling rate, whereby results in the metallic glass internal gear 2 according to the present invention.

In the first preferred embodiment of the internal gear manufacturing method according to the present invention, the core 12 is non-metallic and made of carbon and hence is more resistant to reaction with the metal material 1 and more expansion-resistant than a metallic one. Therefore, the core 12 is easier to remove than a metallic one, whereby the internal gear 2 can easily be obtained as a long molded article. Many internal gears can be obtained all at one time by cutting the long internal gear 2 into segments of a suitable length for the intended purpose. Thus, the internal gears can be obtained in a shorter time than when manufactured one by one by injection molding. The core 12 does not need to be removed intact but can be removed by pulverization, thereby allowing easy and high-precision manufacturing of the internal gear 2.

The core 12 is made of carbon and hence is easy to process and form very accurately into a shape of an external gear. Moreover, the core 12 does not react with the metal material 1 and hence enables high-precision manufacturing of the internal gear 2. Incomplete filling of the metal material 1 is precluded by the above-described manufacturing method, thereby allowing high-precision manufacturing of the internal gear 2 having a fine structure.

While made of carbon in the embodiment according to the present invention, the core 12 may alternatively be made of boron nitride or ceramics and hence may allow manufacturing of the internal gear 2 having a similar fine structure by the embodiment of the internal gear manufacturing method according to the present invention.

Additionally, the core 12 may be removed by dissolution, depending on the dissolvability of the material used therefor. If made of ceramics and in particular when made of calcium sulfate hydrate, i.e., so-called gypsum, the core 12 can be chemically removed using an aqueous solution of gypsum solvent, such as an acid and chelate agent.

Since the high-precision internal gear 2 is made of metallic glass, the high-precision internal gear 2 thus obtained has high hardness, high strength, and other advantages. Therefore, the internal gear 2 thus manufactured may be used for precision devices, such as micro-geared motors required to withstand high loads and have a long life.

As shown by the embodiment in FIG. 3(*a*), the core 12 may comprise a gear portion 12*a* formed into a shape of an external gear; a small bearing 12*b* disposed on a first end of the gear portion 12*a* and with an outer diameter smaller than that of the gear portion 12*a*; and a motor engaging portion 12*c* disposed on a second end of the gear portion 12*a* and with an outer diameter greater than that of the bearing portion 12*b*. Then, as shown in FIG. 3(*b*), an internal gear 2 may be formed so as to integrally comprise an internal gear portion 2*a* corresponding to the gear portion 12*a* of the core 12; a bearing 2*b* corresponding to the bearing portion 12*b*; and a motor mounting portion 2*c* corresponding to a motor engaging portion 12*c*. Such integral formation of the internal gear portion 2*a*, the bearing 2*b*, and the motor mounting portion 2*c* may help part-number reduction. The individual parts may be positioned more accurately and hence may be more rigid than when formed and assembled one by one.

The present application claims priority in International Application No. PCT/JP2008/071582, filed Nov. 27, 2008 and JP Application No. 2007-306557 filed Nov. 27, 2007, the contents of each of which are hereby incorporated herein by reference.

The invention claimed is:

1. An internal gear manufacturing method comprising:
providing a thin, long tubular mold;
providing a non-metallic solid core having a gear portion in a shape of an external gear, said non-metallic solid core has a length equal to that of said tubular mold;
positioning said non-metallic solid core inside and longitudinally along said tubular mold so as to provide a uniform space between the tubular mold and the non-metallic solid core;
pouring a molten metal material under a temperature higher than a melting point thereof into the space between said tubular mold and said non-metallic solid core;
letting said metal material resolidify in said mold containing said core; and
removing said solid core by pulverization or dissolution after resolidification of said molten metal material, wherein said resolidified metal material with the solid core removed forms an internal gear structure.

2. The internal gear manufacturing method in accordance with claim 1, further including a cutting step for cutting a molded article formed of said resolidified metal material into a plurality of segments of a prescribed length, said cutting step following said core removal step.

3. The internal gear manufacturing method in accordance with claim 1, wherein said core further comprises, a bearing portion disposed on a first end of said gear portion and with an outer diameter smaller than that of said gear portion, and a motor engaging portion disposed on a second end of said gear portion and with an outer diameter greater than that of said bearing portion.

4. The internal gear manufacturing method in accordance with claim 1, wherein said core is made of carbon, boron nitride, or ceramics and has a melting point of 1,000° C. or higher.

5. The internal gear manufacturing method in accordance with claim 1, wherein said core removal is performed by pulverization of said core by blasting.

6. The internal gear manufacturing method in accordance claim 1, wherein said core removal is performed by dissolution of said core by a solvent.

7. The internal gear manufacturing method in accordance with claim 1, wherein said metal pouring is performed by pouring said molten metal material into said space by vacuum-pressure casting.

8. A metallic glass internal gear manufactured by the internal gear manufacturing method in accordance with claim 1.

* * * * *